UNITED STATES PATENT OFFICE.

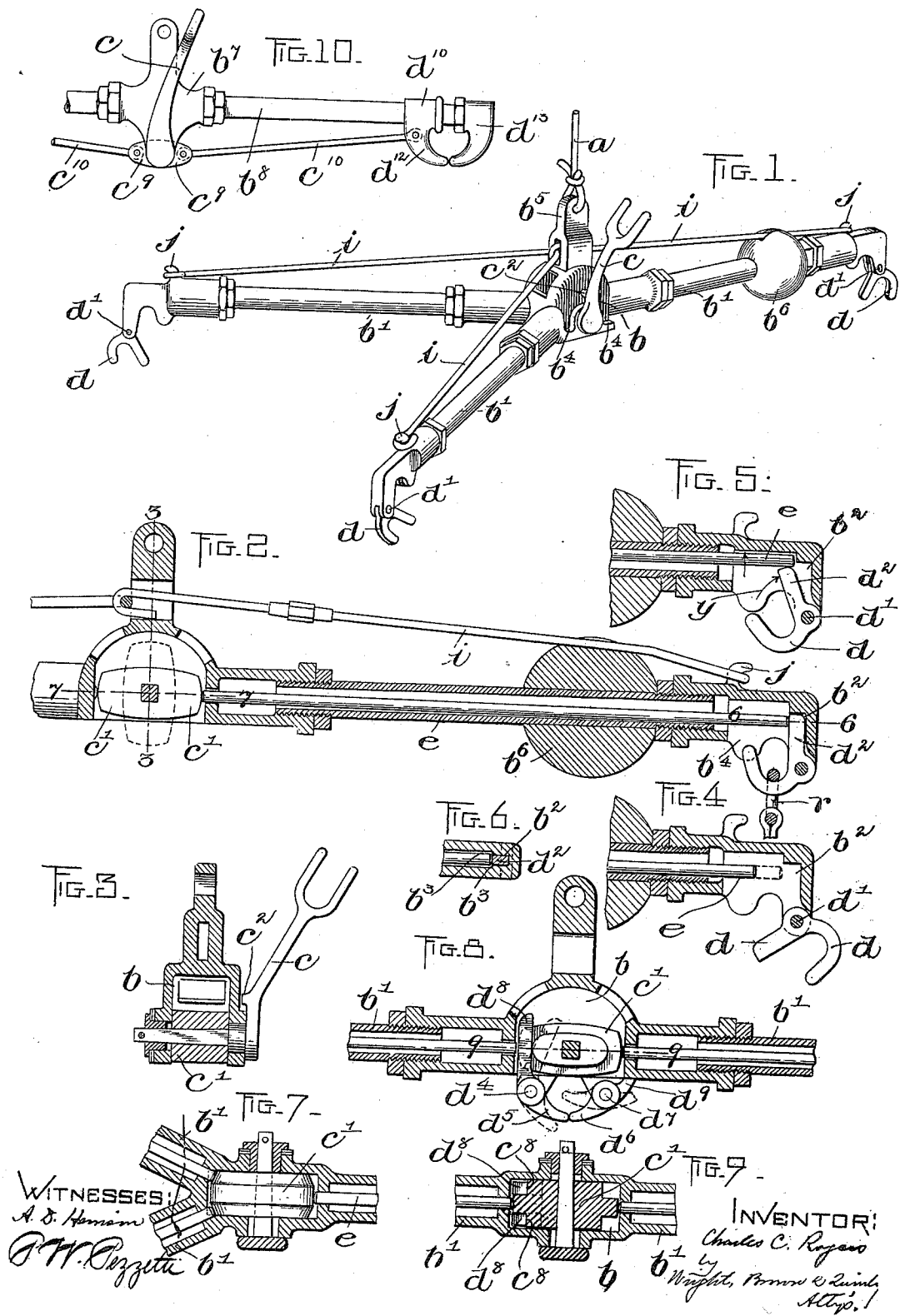

CHARLES C. ROGERS, OF BROCKTON, MASSACHUSETTS.

HARNESS-SUPPORT FOR FIRE-ENGINE USE.

SPECIFICATION forming part of Letters Patent No. 617,188, dated January 3, 1899.

Application filed December 15, 1897. Serial No. 661,985. (No model.)

*To all whom it may concern:*

Be it known that I, CHARLES C. ROGERS, of Brockton, in the county of Plymouth and State of Massachusetts, have invented certain new and useful Improvements in Harness-Holders for Fire-Engine Uses, of which the following is a specification.

This invention has for its object to provide for fire-department use a simple and reliable appliance for holding a harness or a set of harness in a suspended position ready to be dropped upon the horses and to securely hold the harness and quickly release and drop the same, as well as to permit the convenient engagement of the harness with the holding appliance.

The invention consists in the improvements which I will now proceed to describe and claim.

Of the accompanying drawings, forming a part of this specification, Figure 1 represents a perspective view of a harness-holder embodying my invention, the harness-holding hooks being shown in their harness-releasing position. Fig. 2 represents a longitudinal section of a portion of the holder, showing one of the hooks in its harness locking or securing position. Fig. 3 represents a section on line 3 3 of Fig. 2. Fig. 4 represents a view similar to a portion of Fig. 2, showing the hook released. Fig. 5 represents a view similar to Fig. 4, illustrating the operation of resetting the hooks. Fig. 6 represents a section on line 6 6 of Fig. 2. Fig. 7 represents a section on line 7 7 of Fig. 2. Fig. 8 represents a sectional view of a portion of a holder, showing means for supporting the saddle of a single harness. Fig. 9 represents a section on line 9 9 of Fig. 8. Fig. 10 represents a side view of a modification.

The same letters of reference indicate the same parts in all the figures.

In carrying out my invention I provide a frame adapted to be supported in any suitable way in an elevated position, preferably by means of a suspending device $a$. The frame is preferably composed of a casing $b$ and branches or guides $b'$, projecting from said casing. At the extremities of the frame are located movable harness holding and releasing hooks, and at the central portion of the frame is a lever $c$, fulcrumed to the frame and rigidly connected with arms $c'$ $c'$, which coöperate with rods extending outwardly in the guides $b'$ to the said hooks, the arms and rods acting conjointly to lock the hooks in their harness-holding position when the lever is in a given position and to release said hooks when the lever is moved from said position, the hooks being simultaneously released and caused to simultaneously drop the different parts of the harness held by them.

In Figs. 1 to 9, inclusive, I show the preferred construction of two forms of apparatus embodying my invention, the form shown in Figs. 1 to 7, inclusive, being adapted to hold a double harness, while the form shown in Figs. 8 and 9 is intended to hold a single harness.

Referring for the present to Figs. 1 to 7, it will be observed (particularly by reference to Fig. 1) that there are three branches or guides $b'$ and three hooks $d$, pivoted at $d'$ to the outer ends of said branches, the hook at the right-hand end in Fig. 1 being adapted to hold the collar of a double harness, while the hooks on the two diverging branches are adapted to hold the rear portions of the said harness, there being one of these frames over each horse of a pair. Each hook $d$ has a finger $d^2$, which projects upwardly into a recess $b^2$ in the frame when the hook is locked in its harness-holding position, as shown in Fig. 2. Between the fingers $d^2$ and the arms $c'$ are interposed strut-rods $e$, each of which bears at one end on one of the arms $c'$ and at the other end on one of the fingers $d^2$. When the lever $c$ is in the position shown in Fig. 1, it holds the arms $c'$ $c'$ in the position shown in full lines in Fig. 2, and thus forces the strut-rods $e$ outwardly and causes them to lock the hooks $d$ by holding the fingers $d^2$ in the recesses $b^2$, as indicated in Fig. 2. When the lever $c$ is moved from said position far enough to place the arms $c'$ in the dotted-line position shown in Fig. 2, the hooks $d$ are permitted to yield and swing downwardly under the weight of the parts of the harness supported by them, the fingers $d^2$ pushing the strut-rods $e$ inwardly, as indicated in Fig. 4, the hooks being thus inverted, so that the parts of the harness drop freely from them.

The branches or guides $b'$ are preferably tubular, the strut-rods $e$ being inclosed within them. The diameter of the tubular branches or guides is such that the strut-rods $e$ are adapted to move laterally, as well as endwise, so that they can be swung upwardly from their hook-locking position (shown in Fig. 2) to the position shown in Fig. 5, thus permitting the fingers $d^2$ to pass under the ends of the strut-rods when the hooks are being reset to again support the harness, the outer ends of the strut-rods yielding upwardly until the fingers $d^2$ enter the recesses $b^2$, whereupon the rods drop and again lock the hooks. The fingers $d^2$ and recesses $b^2$ are narrower than the diameter of the rods $e$, and the branches $b'$ are provided with shoulders $b^3$ at the mouth of the recesses $b^2$, as shown in Fig. 6. Said shoulders constitute a stop which limits the outward endwise movement of the rod $e$ and prevents said rod from being moved outwardly far enough to interfere with the resetting of the hook $d$.

The lever $c$ is formed at its upper end for detachable engagement with a cord or strap, which may be one of the reins of the harness. When the said rein is pulled to connect it with the bridle, it moves the lever $c$ from the position shown in Fig. 1, thus moving the arms $c'$ to the dotted-line position shown in Fig. 2 and releasing the strut-rods $e$ and hooks $d$. The casing $b$ is provided with stops $b^4$ $b^4$ at opposite sides of the fulcrum of the lever $c$, said stops coöperating with a stud $c^2$ on said lever in preventing the lever from swinging too far in either direction, the stud abutting against one of said stops when the arms $c'$ $c'$ reach the dotted-line position shown in Fig. 2. After the harness has been released and when it is desired to again suspend the harness from the hooks $d$ the operator may restore the lever $c$ to the position shown in Fig. 1, thus forcing the strut-rods $e$ outwardly, and then after engaging the rings $r$ of the harness with the hooks $d$ the hooks may be swung upwardly in the direction indicated by the arrow $y$ in Fig. 5, the fingers $d^2$ of the hooks raising the outer ends of the strut-rods $e$ until the fingers pass by said strut-rods, the rods then dropping and locking the fingers and hooks. In case it is desirable to release either hook independently of the others this may be accomplished by inserting a small piece of wire or other like device in the slot or opening $b^4$, Fig. 2 below the outer end of the strut-rod, said device pushing the outer end of the rod upwardly and releasing the hook.

Since the appliance is suspended from its central portion and is heavily weighted at its ends, I have provided for the purpose of giving the frame sufficient strength a system of truss-rods $i$ $i$, which are engaged at their outer ends with hooked lugs $j,j$ on the branches of the frame, said rods being connected at a point over the casing $b$ and bearing on the upper portion of said casing. In practice the meeting ends of the rods $i$ are interlocked with each other and are contained in a slot formed in an ear $b^5$ on the casing $b$, said ear being engaged with the suspending device $a$. The single branch $b'$ (shown at the right in Fig. 1) is provided with a weight $b^6$ to counterbalance the two diverging arms at the opposite side of the casing $b$.

In Figs. 8 and 9 I show the preferred construction for supporting a single harness. In this case the central casing $b$ will have but two branches or guides $b'$, said branches extending in opposite directions from the casing. The hooks at the outer ends of said arms may be constructed like the hooks $d$ and held and released by strut-rods $e$, interposed between the arms $c'$ $c'$ and the hooks, the said hooks supporting the collar and back-strap of the single harness. To provide for the support of the saddle forming part of a single harness, I pivot at $d^4$ to the casing $b$ a hook $d^5$, formed to coöperate with a similarly-shaped hook $d^6$, which is pivoted at $d^7$ to the casing. The hook $d^5$ is provided with fingers $d^8$ $d^8$, which bear upon shoulders $c^8$ $c^8$, formed on the arms $c'$ $c'$. When the said arms are in the position shown in Fig. 8, they hold the hook $d^5$ in the position shown in full lines in the same figure, its point being thus held in close proximity to the point of the hook $d^6$, so that the two hooks coöperate in supporting the saddle portion of the harness. The hook $d^6$ has a finger $d^9$, which bears against a shoulder on the casing $b$ to prevent downward movement of the hook $d^6$ below the position indicated in full lines in Fig. 8, said hook being movable upwardly, as indicated in dotted lines, to facilitate the insertion of the ring of the saddle into the space guarded by the two hooks. When the arms $c'$ $c'$ are moved to a position similar to that shown in dotted lines in Fig. 2, the hook $d^5$ is released and allowed to fall to the dotted-line position shown in Fig. 8, thus releasing the saddle.

In Fig. 10 I show a modification in which the frame comprises a central section or holder $b^7$ and branches or guides $b^8$, upon which are fitted to slide sockets $d^{10}$, supporting hooks $d^{12}$, which are formed to coöperate with hooks $d^{13}$, affixed to the ends of the branches $b^8$. The lever $c$ may be the same as shown in the previously-described figures, and with it are connected arms $c^9$. These arms are connected by rods $c^{10}$ $c^{10}$ with the hooks $d^{12}$, the rods being jointed both to the arms and to the hooks, so that when the arms are turned from the position shown in Fig. 10 the rods pull the hooks $d^{12}$ away from the hooks $d^{13}$.

I claim—

1. An appliance of the character specified, comprising an elongated frame, movable hooks or fingers mounted on the end portions of the frame and adapted to hold different parts of a harness, a lever fulcrumed on the frame between the end portions thereof, and intermediate rigid connections between the lever and hooks, whereby the hooks are simultaneously locked when the lever is in a given position, and simultaneously released when the lever is moved from said position.

2. An appliance of the character specified, comprising an elongated frame, movable harness-holding hooks or fingers mounted on the end portions of the frame, a lever fulcrumed on said frame between the end portions thereof, arms affixed to the lever, and oppositely-extending longitudinally-movable rods interposed between the said arms and the hooks, said arms and rods coöperating to simultaneously lock the hooks when the lever is in a given position, and to make the hooks simultaneously inoperative when the lever is moved from said position.

3. An appliance of the character specified, comprising an elongated frame, movable harness-holding hooks pivoted to the end portions of the frame, a lever fulcrumed on the frame between the end portions thereof, oppositely-extending arms affixed to the lever, and strut-rods interposed between the said arms and the hooks, said arms and rods coöperating in locking the hooks when the lever is in a given position, and in releasing the hooks when the lever is moved from said position.

4. An appliance of the character specified, comprising a frame, a plurality of harness-holding hooks pivoted to said frame, a lever fulcrumed on the frame, arms affixed to the lever, and strut-rods interposed between the said arms and hooks, said arms being longitudinally movable to lock and release the hooks, and laterally movable to permit the independent locking and releasing of the hooks.

5. An appliance of the character specified, comprising a frame having guides, strut-rods movable therein, the said guides being formed to permit both a longitudinal and a lateral movement of said strut-rods, a lever fulcrumed on the frame and provided with arms arranged to act on the inner ends of the strut-rods, hooks pivoted to the outer ends of the guides and having arms arranged to bear against the outer ends of the strut-rods, and stops arranged to limit the outward movement of the strut-rods and hold the same in position to be lifted by the backward movement of the arms.

6. An appliance of the character specified, comprising a frame composed of a casing and tubular branches or guides projecting therefrom, a rock-shaft journaled in said casing, arms affixed to the rock-shaft within the casing, a lever affixed to the rock-shaft outside the casing, hooks pivoted to the outer ends of the guides, and strut-rods in said guides interposed between the said arms and hooks.

7. An appliance of the character specified, comprising a frame composed of a casing adapted for suspension from an overhead support, branches or guides projecting in opposite directions from said casing, harness-holding hooks on the outer ends of the guides, means supported by the frame for locking and releasing the hooks, and truss-rods extending from the casing to the outer portions of the guides.

8. An appliance of the character specified, comprising a frame, harness-holding hooks pivoted to the ends of the frame, a lever fulcrumed on the frame at a point between said hooks, arms connected with the lever, movable rods interposed between said arms and the hooks, and an intermediate harness-holding hook pivoted to the frame at a point adjacent to the arms and adapted to be locked and released by one of said arms.

In testimony whereof I have signed my name to this specification, in the presence of two subscribing witnesses, this 13th day of December, A. D. 1897.

CHARLES C. ROGERS.

Witnesses:
C. F. BROWN,
A. D. HARRISON.